(12) United States Patent
Zhao et al.

(10) Patent No.: US 11,442,779 B2
(45) Date of Patent: Sep. 13, 2022

(54) METHOD, DEVICE AND COMPUTER PROGRAM PRODUCT FOR DETERMINING RESOURCE AMOUNT FOR DEDICATED PROCESSING RESOURCES

(71) Applicant: Dell Products L.P., Round Rock, TX (US)

(72) Inventors: Junping Zhao, Beijing (CN); Sanping Li, Beijing (CN)

(73) Assignee: Dell Products L.P., Round Rock, TX (US)

( * ) Notice: Subject to any disclaimer, the term of this patent is extended or adjusted under 35 U.S.C. 154(b) by 912 days.

(21) Appl. No.: 16/239,803

(22) Filed: Jan. 4, 2019

(65) Prior Publication Data
US 2019/0220316 A1 Jul. 18, 2019

(30) Foreign Application Priority Data
Jan. 18, 2018 (CN) .................. 201810048693.X (51) Int. Cl.
*G06F 9/46* (2006.01)
*G06F 9/50* (2006.01)
(Continued)

(52) U.S. Cl.
CPC ............ *G06F 9/5016* (2013.01); *G06F 9/505* (2013.01); *G06F 40/205* (2020.01); *G06N 3/04* (2013.01); *G06N 3/10* (2013.01)

(58) Field of Classification Search
CPC ...... G06F 3/0629; G06F 3/0631; G06F 3/067; G06F 9/5016; G06F 9/5027; G06F 9/505;
(Continued)

(56) References Cited

U.S. PATENT DOCUMENTS

2018/0373975 A1 * 12/2018 Yu ........................ G06N 3/04
2020/0272907 A1 * 8/2020 Jin ...................... G06F 9/5016

FOREIGN PATENT DOCUMENTS

GB           2554711 A  *  4/2018  ......... G06F 12/0207
WO   WO-2022059024 A1 *  3/2022  ............... G06N 3/04

OTHER PUBLICATIONS

Rhu et al., vDNN: Virtualized Deep Neural Networks for Scalable, Memory-Efficient Neural Networks Design, 13 pages. (Year: 2016).*
(Continued)

*Primary Examiner* — Gary J Portka
(74) *Attorney, Agent, or Firm* — Ryan, Mason & Lewis, LLP (57) ABSTRACT

Embodiments of the present disclosure relate to a method, device and computer program product for determining a resource amount of dedicated processing resources. The method comprises obtaining a structural representation of a neural network for deep learning processing, the structural representation indicating a layer attribute of the neural network that is associated with the dedicated processing resources; and determining the resource amount of the dedicated processing resources required for the deep learning processing based on the structural representation. In this manner, the resource amount of the dedicated processing resources required by the deep learning processing may be better estimated to improve the performance and resource utilization rate of the dedicated processing resource scheduling.

19 Claims, 5 Drawing Sheets

(51) Int. Cl.
*G06N 3/10* (2006.01)
*G06F 40/205* (2020.01)
*G06N 3/04* (2006.01)

(58) Field of Classification Search
CPC .......... G06F 40/205; G06N 3/04; G06N 3/06; G06N 3/10
USPC ...................................... 706/31, 15; 711/170
See application file for complete search history.

(56) References Cited

OTHER PUBLICATIONS

Tony Paikeday, "Seven Service Providers Delivering the GPU-Accelerated Cloud—Build on NVIDIA GRID," blogs.nvidia.com/blog/2016/09/27/the-gpu-accelerated-cloud/, Sep. 27, 2016, 4 pages.
Amazon.com, "Linux Accelerated Computing Instances," docs.aws.amazon.com/AWSEC2/iatest/UserGuide/using_cluster-computing.html, 2018, 7 pages.
Tiffany Trader, "Microsoft Puts GPU Boosters on Azure Cloud," hcpwire.com/2015/09/29/microsoft-puts-gpu-boosters-on-azure-cloud/, Sep. 30, 2015, 20 pages.

* cited by examiner

FIG. 5

METHOD, DEVICE AND COMPUTER PROGRAM PRODUCT FOR DETERMINING RESOURCE AMOUNT FOR DEDICATED PROCESSING RESOURCES

RELATED APPLICATION(S)

The present application claims priority to Chinese Patent Application No. 201810048693.X, filed Jan. 18, 2018 and entitled "Method, Device and Computer Program Product for Determining Resource Amount of Dedicated Processing Resources," which is incorporated by reference herein in its entirety.

FIELD

Embodiments of the present disclosure generally relate to resource amount determination, and more specifically, to a method, device and computer program product for determining a resource amount of dedicated processing resources.

BACKGROUND

In recent years, emerging technologies, such as high-performance computing, machine learning, deep learning and artificial intelligence have developed rapidly. In the current data center or cloud, in addition to resources such as central processing units (CPUs) and storage apparatuses that are provided to the workloads of these emerging technologies, dedicated processing resources, for instance, graphic processing units (GPUs) and field programmable gate arrays (FPGAs), are also provided to meet the needs of these emerging technologies for dedicated processing. However, in order to better serve these emerging technologies, there is also a need for better estimating the resource amount of the dedicated processing resources required for implementing these emerging technologies so as to improve the technology for scheduling the dedicated processing resources.

SUMMARY

Embodiments of the present disclosure provide a method, device and computer program product for determining a resource amount of dedicated processing resources.

In a first aspect of the present disclosure, there is provided a method of determining a resource amount for dedicated processing resources, comprising: obtaining a structural representation of a neural network for deep learning processing, the structural representation indicating a layer attribute of the neural network that is associated with dedicated processing resources; and determining the resource amount of the dedicated processing resources required for the deep learning processing based on the structural representation.

In a second aspect of the present disclosure, there is provided a device for determining a resource amount for dedicated processing resources, comprising at least one processing unit and at least one memory coupled to the at least one processing unit and storing instructions executed by the at least one processing unit, the instructions, when executed by the at least one processing unit, causing the device to implement acts. The acts include: obtaining a structural representation of a neural network for deep learning processing, the structural representation indicating a layer attribute of the neural network that is associated with the dedicated processing resources; and determining the resource amount of the dedicated processing resources required for the deep learning processing based on the structural representation.

In a third aspect of the present disclosure, there is provided a computer program product being tangibly stored on a non-transient computer readable medium and comprising machine executable instructions, the machine executable instructions, when executed, cause a machine to perform steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description of the example embodiments of the present disclosure with reference to the accompanying drawings, the above and other objectives, features, and advantages of the present disclosure will become more apparent. In example embodiments of the present disclosure, the same reference signs usually represent the same components.

Throughout the drawings, the same or corresponding reference symbols refer to the same or corresponding parts.

DETAILED DESCRIPTION

Preferred embodiments of the present disclosure will be described in the following in greater detail with reference to the drawings. Although preferred embodiments of the present disclosure are illustrated in the drawings, it is to be understood that the present disclosure may be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." Terms "first," "second" and others can denote different or identical objects. The following text may also contain other explicit or implicit definitions.

The processing using emerging technologies, such as high-performance computing, machine learning, deep learning and artificial intelligence, requires a large amount of dedicated processing resources during a long period of time. For example, the processing using these emerging technologies has a great demand on the computing capability (generally represented by Floating Point Operations Per Second (FLOPS)) and storage capability (memories on the dedicated processing resources) of dedicated processing resources during a time period of hours, days or even weeks. Therefore, before the processing using these emerging technologies is performed, correct estimation of the resource amount of the dedicated processing resources required for the processing is vital for improving the utilization rate of dedicated processing resources and reducing costs.

However, traditionally, the estimation of the resource amount of the dedicated processing resources required to perform the processing in the applications/frames for these emerging technologies either requires a large amount of prior knowledge or depends on the applications/frames per se for these emerging technologies. However, on the one hand, as the user that performs the processing is usually not the builder of these applications/frames, the user lacks the knowledge of these applications/frames. Or, even if the user builds these applications, the user possibly lacks knowledge about the underlying architecture of these applications/frames. Therefore, in practice, it is not feasible to require the user to have a large amount of prior knowledge to manually estimate the resource amount of the dedicated processing resources required for the processing using these emerging technologies.

On the other hand, in the case that the resource amount of the dedicated processing resources required for the processing is estimated depending on the applications/frames per se of these emerging technologies, these applications/frames would generally over-estimate their required resource amount to reserve a large amount of dedicated processing resources. In extreme cases, these applications/frames will even occupy all the available dedicated processing resources regardless of the resource amount actually needed, which will reduce the utilization rate of the dedicated processing resources significantly.

To at least partly solve the above problem and one or more of the other potential problems, example embodiments of the present disclosure provide a scheme for determining a resource amount of dedicated processing resources. The scheme obtains a structural representation of the neural network for the deep learning processing before deep learning processing is performed, and determines the resource amount of the dedicated processing resources required for the deep learning processing based on this structure. In this manner, it is possible to predict the resource amount of the required dedicated processing resources quickly, accurately and effectively using a structure of a neural network for deep learning processing without depending on a large amount of prior knowledge and the applications/frames. Thus, the dedicated processing resources may be scheduled based on the accurate required resource amount so as to improve the performance and resource utilization rate of the scheduling system for dedicated processing resources.

Please note that although only deep learning is taken as an example for illustration in the present disclosure, it is to be understood that embodiments of the present disclosure are also applicable to emerging technologies like high-performance computing, machine learning and artificial intelligence.

Figure 1:
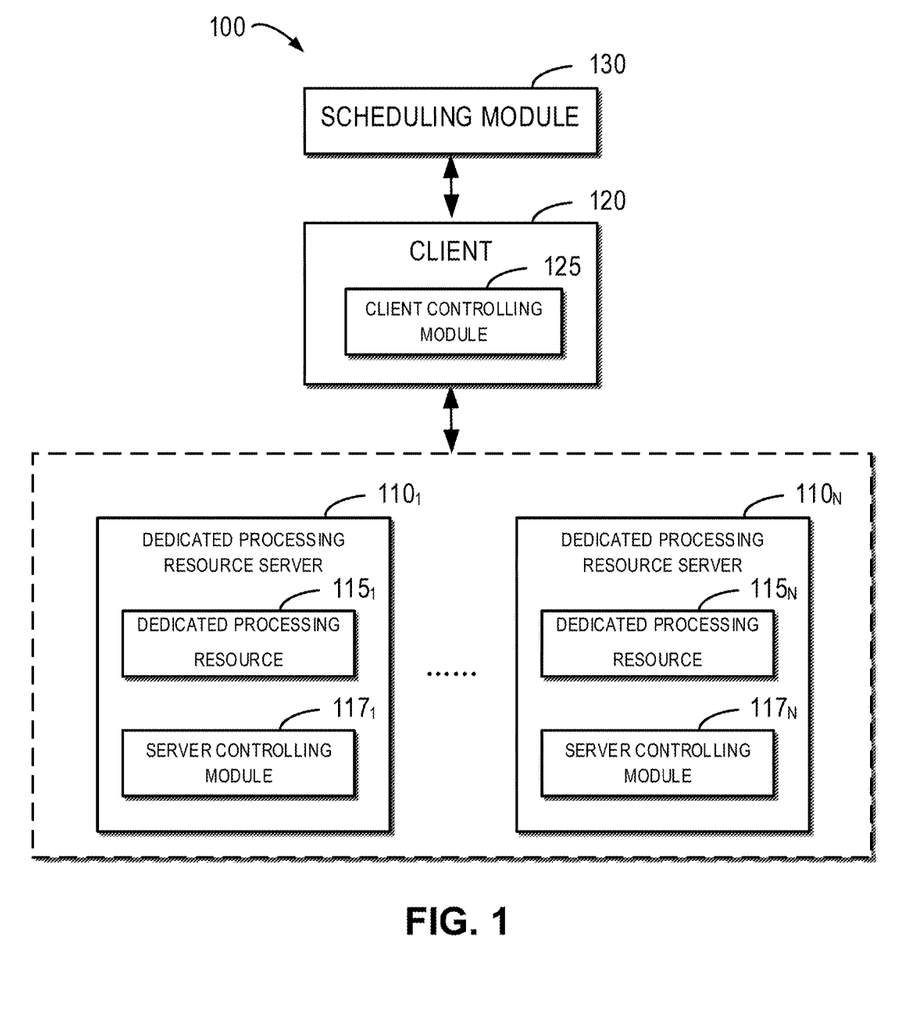
FIG. 1 is a schematic diagram illustrating a scheduling system for dedicated processing resources in accordance with embodiments of the present disclosure.

FIG. 1 is a schematic diagram illustrating a scheduling system 100 for dedicated processing resources in accordance with embodiments of the present disclosure. It is to be understood that the scheduling system 100 for dedicated processing resources shown in FIG. 1 is only for illustrative purpose, rather than suggesting any limitation to the scope of the present disclosure. Embodiments of the present application may be embodied in different structures.

As shown in FIG. 1, the scheduling system 100 for dedicated processing resources includes a group of dedicated processing resource servers $110_1$-$110_N$ (hereinafter collectively referred to as dedicated processing resource server 110), where N is a natural number greater than 1. The dedicated processing resource servers $110_1$-$110_N$ may include dedicated processing resources $115_1$-$115_N$ (hereinafter collectively referred to as dedicated processing resource 115), respectively. For the purpose of simplicity, FIG. 1 only illustrates one dedicated processing resource server 110 including one dedicated processing resource 115. However, it is to be understood that one dedicated processing resource server 110 may include a plurality of dedicated processing resources 115.

Please note that although FIG. 1 illustrates separate dedicated processing resource servers $110_1$-$110_N$ and the dedicated processing resources $115_1$-$115_N$ thereon, the dedicated processing resource servers $110_1$-$110_N$ and the dedicated processing resources $115_1$-$115_N$ may be viewed as pooled and virtual manageable resources (as indicated by the dotted block in FIG. 1). Additionally, the dedicated processing resource servers $110_1$-$110_N$ may have different configurations. Therefore, compared with traditional technologies, such a dedicated processing resource cluster including a plurality of dedicated processing resource servers $110_1$-$110_N$ is dynamic and shared.

In some embodiments, the dedicated processing resource servers $110_1$-$110_N$ may further include server controlling modules $117_1$-$117_N$ (hereinafter collectively referred to as server controlling module 117), respectively. The server controlling module 117 may manage scheduling requests for the dedicated processing resource 115 in the dedicated processing resource server 110.

The scheduling system 100 for dedicated processing resources further includes a client 120. For example, the client 120 may be a deep learning application/frame performing deep learning processing. In some embodiments, the client 120 may include a client controlling module 125. For example, the client controlling module 125 may reside in client 120 in the form of a plugin.

When the structure of the neural network for the deep learning processing is known, the resource amount of the dedicated processing resources required for the deep learning processing is predictable, thus the client controlling module 125 may obtain a structural representation of the neural network for the deep learning processing before the client 120 performs deep learning processing, and determine the resource amount of the dedicated processing resource 115 required for the deep learning processing based on this structural representation, so as to request the dedicated processing resource 115 based on the determined resource amount. Moreover, the scheduling system 100 for dedicated processing resources further includes a scheduling module 130 which may allocate the dedicated processing resource 115 to the client 120 based on the resource amount of the dedicated processing resource 115 requested by the client 120 and available dedicated processing resources in the system. Then, the client 120 may request the allocated dedicated processing resource 115 from the dedicated processing resource server 110.

In this fashion, the scheduling system 100 for dedicated processing resources may estimate the resource amount of the dedicated processing resources required for the deep learning processing quickly, accurately and effectively by means of the structure of the neural network for the deep learning processing before the deep learning processing is performed. Thus, the scheduling system 100 for dedicated processing resources may schedule dedicated processing resources based on the accurate required resource amount, so as to improve the performance the resource utilization rate of the scheduling system 100 for dedicated processing resources.

In the following text, reference will be made to FIGS. 2-4 to depict example operations for the client controlling module 125 to determine the resource amount of the dedicated processing resource 115 required for the deep learning processing.

Figure 2:
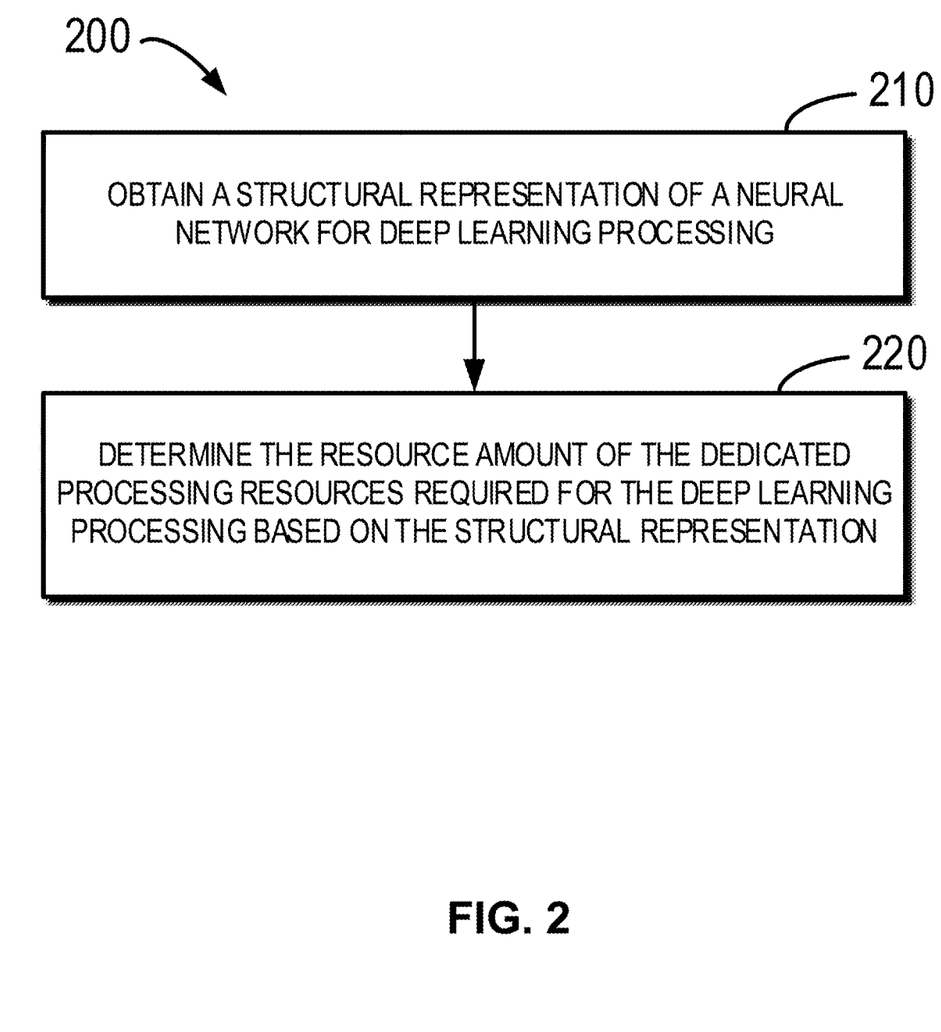
FIG. 2 is a flowchart illustrating a method of determining a resource amount of dedicated processing resources in accordance with embodiments of the present disclosure.

FIG. 2 is a flowchart illustrating a method 200 of determining a resource amount of a dedicated processing resource 115 in accordance with embodiments of the present disclosure. For example, the method 200 may be implemented by the client controlling module 125 shown in FIG. 1. It is to be understood that the method may also include additional steps not shown and/or omit the shown steps and the scope of the present disclosure is not limited in this aspect.

At 210, the client controlling module 125 obtains the structural representation of the neural network for the deep learning processing. The structural representation may include various data associated with the neural network for the deep learning processing. For example, the structural representation may include layer attributes associated with the neural network layers of the neural network, an epoch number of all the input data through the neural network, an iteration number, a batch size, and a gradient optimization method and so on.

In some embodiments, the client controlling module 125 may obtain a structural representation of the neural network for deep learning processing before the deep learning processing is implemented. Alternatively, the client controlling module 125 may, obtain the structural representation of the neural network associated with the dedicated processing resource 115 for the deep learning processing, after the deep learning processing has been performed, but before the task using the dedicated processing resource 115 in the deep learning processing is performed. In this manner, it is possible to determine the resource amount of the dedicated processing resource 115 required for the deep learning processing more dynamically, so as to improve the accuracy of resource amount determination.

The client controlling module 125 may obtain the structural representation from a deep learning application performing deep learning processing. In some embodiments, the deep learning application has separate files storing the structural representation. In this case, the client controlling module 125 may obtain a file containing the structural representation and parse the file to obtain the structural representation.

Alternatively, the client controlling module 125 may request the structural representation from the deep learning application, and in response to receiving a response from the deep learning application, obtain the structural representation from the response. For example, the client controlling module 125 may request the structural representation from the deep learning application with an application programming interface (API) provided by the deep learning application.

Figure 3:
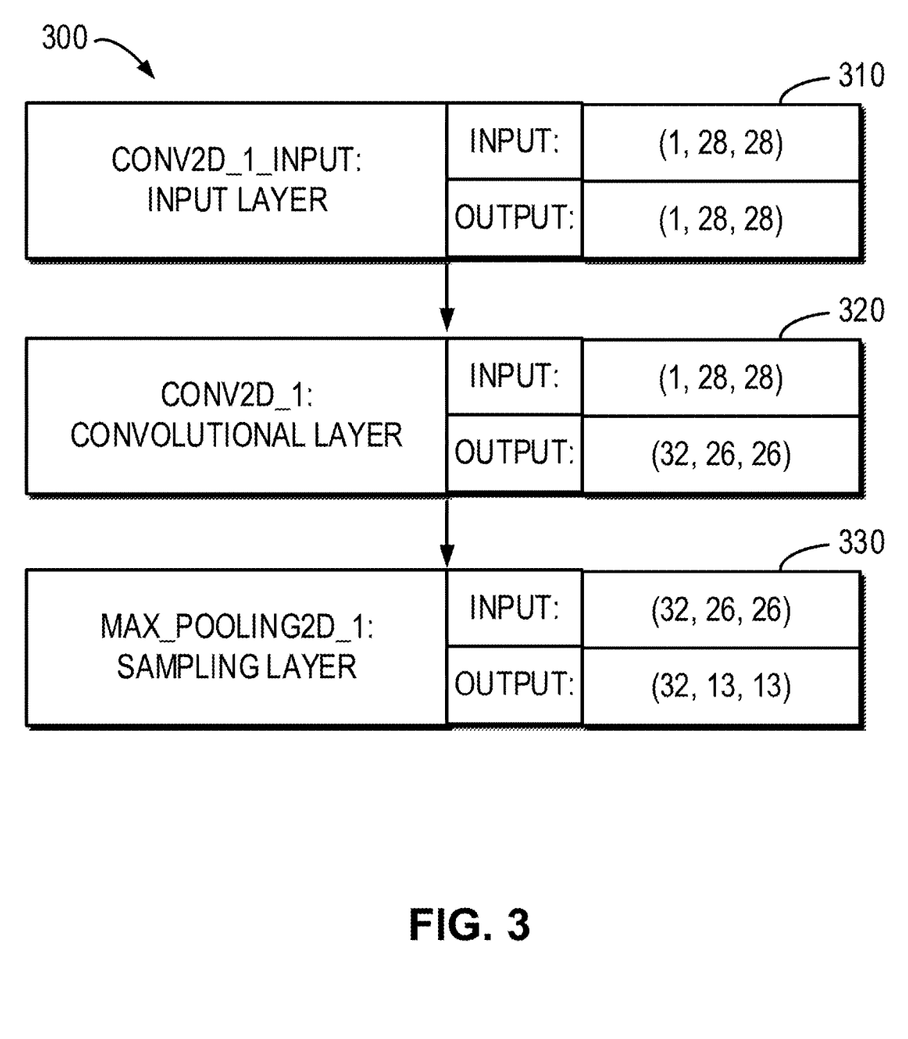
FIG. 3 is a schematic diagram illustrating an example of a specific structural representation of a neural network for deep learning processing in accordance with embodiments of the present disclosure.

FIG. 3 is a schematic diagram illustrating an example of a specific structural representation 300 of a neural network for deep learning processing in accordance with embodiments of the present disclosure. As the deep learning applications performing deep learning processing are different, the structural representations of the neural network obtained from the deep learning applications are generally different. Therefore, the structural representation 300 is only a specific implementation of the structural representations of the neural network for the deep learning processing, and structural representations of the neural network for the deep learning processing are not limited in this aspect. For example, the structural representations of the neural network for the deep learning processing may have the representation form of computer program code.

The structural representation 300 includes a plurality of blocks 310-330 which correspond to a plurality of neural network layers of the neural network, respectively, and contain data associated with respective neural network layers. As shown in FIG. 3, the block 310 indicates that the name of the corresponding neural network layer is CONV2D_1_INPUT, the type is an input layer, the input data is a black-white image of 1 channel×28 pixels in width×28 pixels in height, and the output data is a black-white image of 1 channel×28 pixels in width×28 pixels in height. The blocks 320-330 have a similar meaning, and thus will not be further described here.

Moreover, the structural representation 300 further indicates the relationship between the neural network layers based on the connection sequence of the blocks. For example, the input layer corresponding to the block 310 is the upstream neural network layer of the convolutional layer corresponding to block 320, and the input layer corresponding to the block 330 is the downstream neural network layer of the convolutional layer corresponding to the block 320. The upstream neural network layer represents the layer from which input data is obtained, while the downstream neural network layer represents the layer to which data is output.

Furthermore, the structural representation 300 may further include implicit data about the structure of the neural network. The client controlling module 125 may obtain the implicit data by analyzing the structural representation 300. For example, as the input of the convolutional layer corresponding to the block 320 is (1, 28, 28) while the output is (32, 26, 26), changing from 1 channel to 32 channels, the client controlling module 125 may determine that the number of the convolutional layer is 32 by analyzing the structural representation 300.

Although the client controlling module 125 may obtain data associated with the structure of the neural network for the deep learning directly from the specific structural representation like the structural representation 300, as stated above, since the deep learning applications for performing deep learning processing are different, the structural representations of the neural network obtained from the deep learning applications are generally different. Therefore, to further improve the process for determining the resource amount of the dedicated processing resources, the client controlling module 125 may normalize structural representations with a particular representation form for the deep learning application, such as the structural representation 300, as a normalized structural representation. The client controlling module 125 may also be used for pattern extraction, change tracking, application categorization and so on by comparing and analyzing normalized structural representations for different deep learning applications.

In some embodiments, to normalize the specific structural representation, the client controlling module 125 may determine layer attributes associated with the neural network layer of the neural network based on the specific structural representation. The layer attributes may include an identifier of the neural network layer, a type of the neural network layer, an upstream neural network layer of the neural network layer, and a downstream neural network layer of the neural network layer.

For example, the identifier of the neural network layer may indicate the name of the neural network layer or may indicate other identification data of the neural network layer. The type of the neural network layer may indicate whether the neural network layer is a data type layer (such as an input layer and so on), a computing type layer (such as a convolutional layer, a fully-connected layer and so on) or a controlling layer (such as a sampling layer). Additionally, the upstream neural network layer of the neural network and the downstream neural network layer may indicate one or more input neural network layers and output neural network layers for the neural network layer.

Optionally, the layer attributes may further include configurable attributes of the neural network layer. For example, the configurable attributes may indicate the input data shape of the neural network layer, the input data size, the stride, the padding, and the convolution kernel size and so on.

For example, the client controlling module 125 may determine the layer attributes by analyzing the structural representation 300. Taking the block 310 as an example, the client controlling module 125 may determine that the identifier of the block 310 is "CONV2D_1_INPUT," the type is an input layer, the upstream neural network layer does not exist, the downstream neural network layer is a CONV2D_1 layer corresponding to the block 320, and the configurable attribute is that: the input data is a black-white image of 1 channel×28 pixels in width×28 pixels in height, and the output data is a black-white image of 1 channel×28 pixels in width×28 pixels in height.

The client controlling module 125 may convert the specific structural representation as a normalized structural representation based on the determined layer attributes. FIG. 4 is a schematic diagram illustrating an example of a normalized structural representation 400 of a neural network for deep learning processing in accordance with embodiments of the present disclosure. The structural representation 400 is only a specific implementation of the normalized structural representation of the neural network for the deep learning processing, and the normalized structural representation may have any suitable form of representation.

Figure 4:
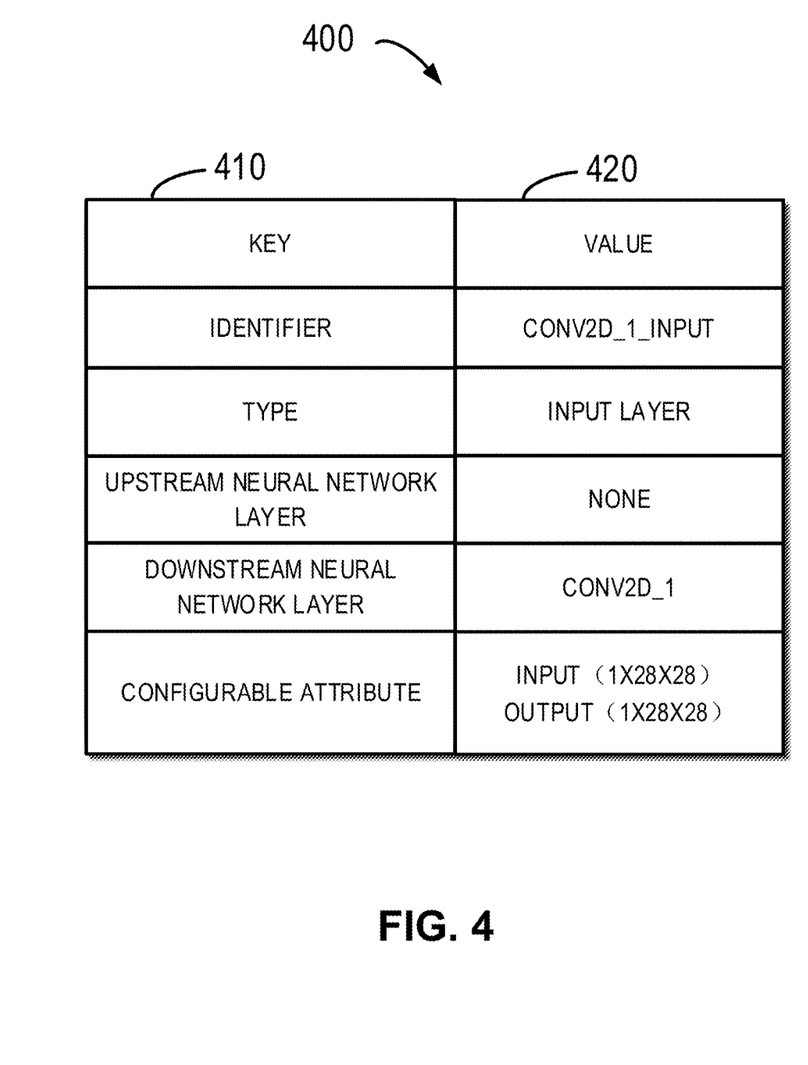
FIG. 4 is a schematic diagram illustrating an example of a normalized structural representation of a neural network for deep learning processing in accordance with embodiments of the present disclosure.

Particularly, FIG. 4 illustrates a normalized structural representation corresponding to the block 310 in the specific structural representation 300. The blocks 320-340 have the similar normalized structural representations, and thus the depiction thereof is omitted herein.

As illustrated in FIG. 4, the structural representation 400 may be organized in the form of a key-value pair, where the key 410 indicates the layer attribute of the neural network layer of the neural network, and value 420 indicates the value of the layer attribute. For example, the key 410 may include the identifier, type, upstream neural network layer, downstream neural network layer and configurable attribute. Accordingly, the value 420 corresponding to these keys indicates that the identifier is CONV2D_1_INPUT, the type is an input layer, the upstream neural network layer does not exist, the downstream neural network layer is a CONV2D_1 layer, and the configurable attribute is that the input data is a black-white image of 1 channel×28 pixels in width×28 pixels in height, and the output data is a black-white image of 1 channel×28 pixels in width×28 pixels in height.

In some embodiments, these key-value pairs may be organized in the form of a graph. The nodes in the graph may represent the neural network layers, and the edges of the graph may indicate the input and output data of the neural network layers.

Returning to FIG. 2, at 220, the client controlling module 125 may determine the resource amount of the dedicated processing resources required for the deep learning processing based on the obtained structural representation (such as the structural representation 300 and the structural representation 400). In determining the resource amount of the required dedicated processing resource, the two resource amounts that should be given the most attention are a memory resource amount and a computing resource amount.

The memory resource amount required for the deep learning processing depends on the layer memory resource amount of each neural network layer of the neural network. In some embodiments, the client controlling module 125 may determine the layer memory resource amount of each neural network layer for the neural network based on the structural representation. Here, the layer memory resource amount indicates the resource amount of the memory of the dedicated processing resource required for the respective neural network layers.

The manner of determining the memory resource amount of common types of neural network layers may be depicted below. For example, for the input layer, the client controlling module 125 may determine the layer memory resource amount of the input layer based on parameters such as the size of the floating point number, the batch size, the number of channels, the height and the width. For example, the client controlling module 125 may calculate the layer memory resource amount of the input layer based on the following equation: the layer memory resource amount of the input layer=the size of the floating point number×the batch size× the number of channels×the height×the width.

For the convolutional layer, the client controlling module 125 may determine the layer memory resource amount of the convolutional layer based on parameters, such as the size of the floating point number, the batch size, the number of convolution output channels, the convolution output height and the convolution output width and so on. For example, the client controlling module 125 may calculate the layer memory resource amount of the convolutional layer based on the following equation: the layer memory resource amount of the convolutional layer=the size of the floating point number×the batch size×the number of convolution output channels×the convolution output height×the convolution output width.

For the sampling layer, the client controlling module 125 may determine the layer memory resource amount of the sampling layer based on parameters such as the size of the floating point number, the batch size, the number of convolution output channels, the convolution output height, the convolution output width and the sampling stride. For example, the client controlling module 125 may calculate the layer memory resource amount of the sampling layer based on the following equation: the layer memory resource amount of the sampling layer=the size of the floating point number×the batch size×the number of convolution output channels×(the convolution output height/the sampling stride)×(the convolution output width/the sampling stride).

For the fully-connected layer, the client controlling module 125 may determine the layer memory resource amount of the fully-connected layer based on parameters such as the size of the floating point number, the batch size, and the fully-connected output. For example, the client controlling module 125 may calculate the layer memory resource amount of the fully-connected layer based on the following equation: the layer memory resource amount of the fully-connected layer=the size of the floating point number×the batch size×the fully-connected output. Then the client controlling module 125 may determine the required memory resource amount based on the layer memory resource amount. In some embodiments, the memory resource amount required for the deep learning processing may be obtained by accumulating the layer memory resource amount of each neural network layer of the neural network. In this case, the client controlling module 125 may determine the memory resource amount based on the sum of the layer memory resource amounts.

The above describes the process of determining the memory resource amount required for the neural network in forward propagation. It is to be understood that the required memory resource amount also depends on other factors, such as the memory resource amount required for the data and the parameters (such as gradient) of the neural network in backward propagation, and the memory resource amount required in using Fast Fourier Transform (FFT). Therefore, in some embodiments, the client controlling module 125 may determine the final memory resource amount based on the sum of all the required memory resource amounts.

Additionally, the computing resource amount required for the deep learning processing depends on the layer computing resource amount of each neural network layer of the neural network. In some embodiments, the client controlling module 125 may determine the layer computing resource amount for each neural network layer of the neural network based on structural representation. Here, the layer computing resource amount indicates the computing capability of the dedicated processing resources required for the respective neural network layers.

For common types of neural network layers, the manner of determining the layer computing resource amount may refer to the manner of determining the layer memory resource amount stated above, but does not take into account the size of the floating point number. For example, the client controlling module 125 may determine the layer computing resource amount of the convolutional layer based on parameters, such as the batch size, the number of convolution output channels, convolution output height and convolution output width and so on. For example, the client controlling module 125 may calculate the layer computing resource amount of the convolutional layer based on the following equation: the layer computing resource amount of the convolutional layer=the batch size×the number of convolution output channels×the convolution output height×the convolution output width. The layer computing resource amount of other common types of neural network layers is determined in a similar way to that of the input layer. Thus, the related depiction is omitted herein.

Then, the client controlling module 125 may determine the required computing resource amount based on the layer computing resource amount. In some embodiments, the client controlling module 125 may select, from the layer computing resource amount, the target layer computing resource amount that requires a computing capability above a predetermined threshold, and determine the required computing resource amount based on the target layer computing resource amount. For example, since in a given time period, only one neural network layer can operate in the dedicated processing resources, the computing resource amount required for the deep learning processing depends on the maximum layer computing resource amount of each neural network layer of the neural network. Generally, the layer computing resource amount required for the convolutional layer and the fully-connected layer is the maximal.

Then, the client controlling module 125 may request the dedicated processing resource 115 based on the determined resource amount request. In some embodiments, the client controlling module 125 may transmit a scheduling request to the scheduling module 130 based on the determined resource amount to request the dedicated processing resource 115. For example, the scheduling request may indicate the requested client 120, the required total memory resource amount and the required maximal computing resource amount.

When the scheduling module 130 receives the scheduling request from the client controlling module 125, the scheduling module 130 may allocate the dedicated processing resource 115 to client 120 based on the resource amount of the dedicated processing resource 115 required for the client 120 and the available dedicated processing resources in the system. Then, the client 120 may request the allocated dedicated processing resource 115 from the dedicated processing resource server 110.

In this manner, the client controlling module 125 may estimate the resource amount of the required dedicated processing resources quickly, accurately and effectively. Therefore, the client controlling module 125 may request the dedicated processing resources based on the more accurately determined resource amount, thereby improving the performance and the resource utilization rate of the scheduling system 100 for dedicated processing resources.

Figure 5:
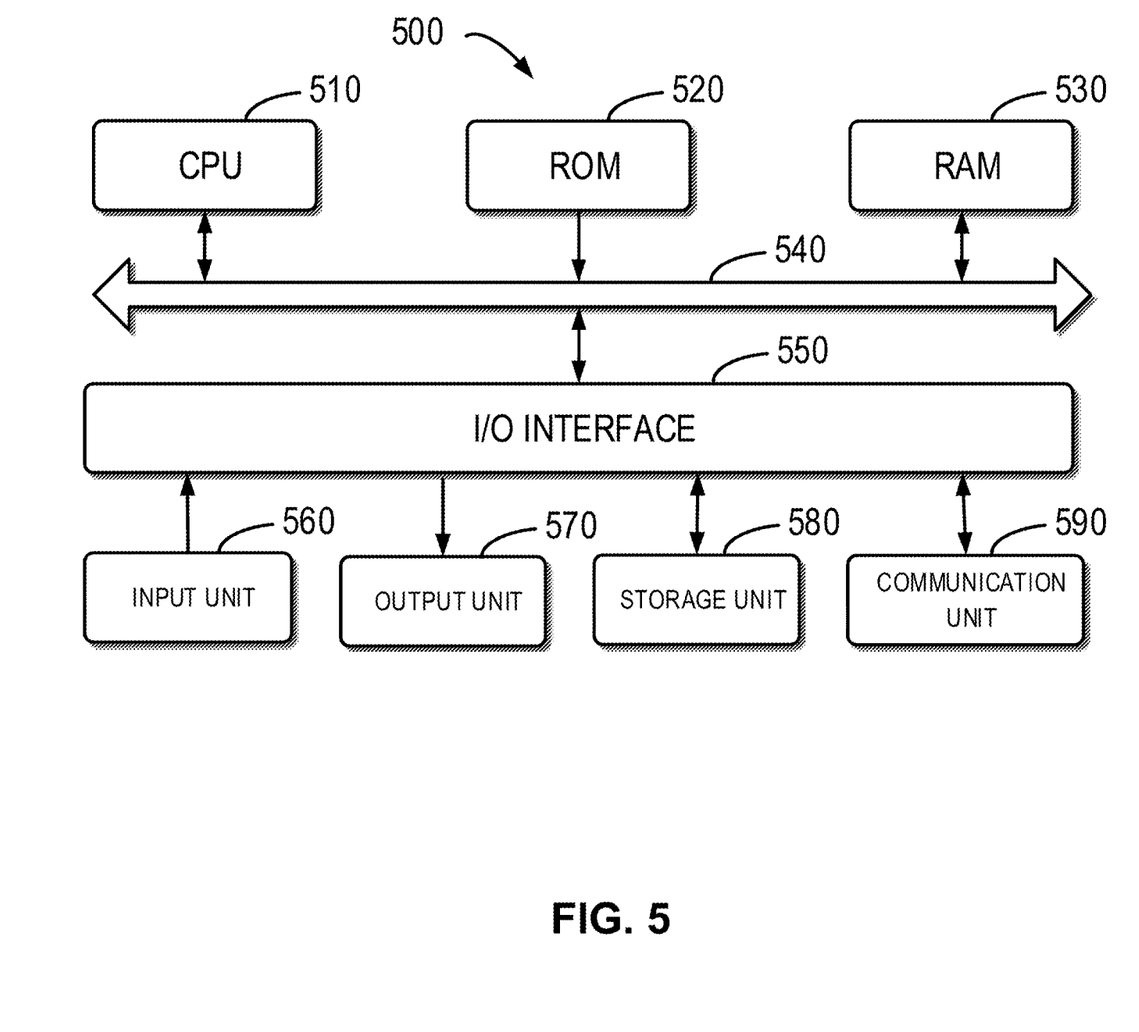
FIG. 5 is a schematic block diagram illustrating an example device that may be used to implement embodiments of the present disclosure.

FIG. 5 is a schematic block diagram illustrating an example device 500 that may be used to implement embodiments of the present disclosure. For example, the scheduling module 130 shown in FIG. 1 may be implemented by a device 500. As illustrated, the device 500 comprises a central processing unit (CPU) 510 which can execute various appropriate actions and processing based on the computer program instructions stored in a read-only memory (ROM) 520 or the computer program instructions loaded into a random access memory (RAM) 530 from a storage unit 580. The RAM 530 also stores all kinds of programs and data required for operating the device 500. CPU 510, ROM 520 and RAM 530 are connected to each other via a bus 540 to which an input/output (I/O) interface 550 is also connected.

A plurality of components in the device 500 are connected to the I/O interface 550, including: an input unit 560, such as keyboard, mouse and the like; an output unit 570, such as various types of displays, loudspeakers and the like; a storage unit 580, such as magnetic disk, optical disk and the like; and a communication unit 590, such as network card, modem, wireless communication transceiver and the like. The communication unit 590 allows the device 500 to exchange information/data with other devices through computer networks such as Internet and/or various telecommunication networks.

Each procedure and processing described above, for example, method 200, may be executed by a processing unit 510. For example, in some embodiments, the method 200 can be implemented as computer software programs, which are tangibly included in a machine-readable medium, such as storage unit 580. In some embodiments, the computer program can be partially or completely loaded and/or installed to the device 500 via ROM 520 and/or the communication unit 590. When the computer program is loaded to RAM 530 and executed by CPU 510, one or more steps of the above described method 200 are implemented.

The present disclosure may be a method, an apparatus, a system and/or a computer program product. The computer program product may include a computer-readable storage medium loaded with computer-readable program instructions thereon for executing various aspects of the present disclosure.

The computer-readable storage medium may be a tangible device capable of holding and storing instructions used by the instruction-executing device. The computer-readable storage medium may be, but is not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, RAM, ROM, erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via Internet, local area network (LAN), wide area network (WAN) and/or wireless network. The network may include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C++ and so on, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including LAN or WAN, or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described with reference to the flow chart and/or block diagram of the method, device (system) and computer program product according to the embodiments of the present disclosure. It is to be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those of ordinary skill in the art.

What is claimed is:

1. A method of determining a resource amount of dedicated processing resources, comprising:
   obtaining a structural representation of a neural network for deep learning processing, the structural representation indicating a layer attribute of the neural network that is associated with the dedicated processing resources; and
   determining the resource amount of the dedicated processing resources required for the deep learning processing based on the structural representation.

2. The method according to claim 1, wherein obtaining the structural representation comprises:
   obtaining a specific structural representation of the neural network, the specific structural representation having a specific form of representation for a deep learning application performing the deep learning processing; and
   normalizing the specific structural representation as the structural representation.

3. The method according to claim 2, wherein normalizing the specific structural representation as the structural representation comprises:
   determining a layer attribute associated with a neural network layer of the neural network based on the specific structural representation; and
   normalizing the specific structural representation as the structural representation based on the layer attribute.

4. The method according to claim 3, wherein determining the layer attribute comprises determining at least one of:
   an identifier of the neural network layer;
   a type of the neural network layer;
   an upstream neural network layer of the neural network layer;
   a downstream neural network layer of the neural network layer; and
   a configurable attribute of the neural network layer.

5. The method according to claim 1, wherein obtaining the structural representation comprises:
   obtaining a file containing the structural representation; and
   parsing the file to obtain the structural representation.

6. The method according to claim 1, wherein obtaining the structural representation comprises:
   requesting the structural representation from a deep learning application performing the deep learning processing; and
   in response to receiving a response from the deep learning application, obtaining the structural representation from the response.

7. The method according to claim 1, wherein determining the resource amount comprises:
   determining at least one of a memory resource amount and a computing resource amount of the dedicated processing resources required for the deep learning processing.

8. The method according to claim 7, wherein determining the memory resource amount comprises:
   determining a layer memory resource amount for each neural network layer of the neural network based on the structural representation, the layer memory resource amount indicating a memory of the dedicated processing resources required for a corresponding neural network layer; and
   determining the memory resource amount based on a sum of the layer memory resource amounts.

9. The method according to claim 7, wherein determining the computing resource amount comprises:
   determining a layer computing resource amount for each neural network layer of the neural network based on the structural representation, the layer computing resource amount indicating a computing capability of the dedicated processing resources required for a corresponding neural network layer;
   selecting, from the layer computing resource amounts, a target layer computing resource amount requiring a computing capability above a predetermined threshold; and
   determining the computing resource amount based on the target layer computing resource amount.

10. A device for determining a resource amount of dedicated processing resources, comprising:
    at least one processing unit; and
    at least one memory coupled to the at least one processing unit and storing instructions executed by the at least one processing unit, the instructions, when executed by the at least one processing unit, causing the device to implement acts, comprising:
    obtaining a structural representation of a neural network for deep learning processing, the structural representation indicating a layer attribute of the neural network that is associated with the dedicated processing resources; and
    determining the resource amount of the dedicated processing resources required for the deep learning processing based on the structural representation.

11. The device according to claim 10, wherein obtaining the structural representation comprises:
    obtaining a specific structural representation of the neural network, the specific structural representation having a specific form of representation for a deep learning application performing the deep learning processing; and
    normalizing the specific structural representation as the structural representation.

12. The device according to claim 11, wherein normalizing the specific structural representation as the structural representation comprises:
    determining a layer attribute associated with a neural network layer of the neural network based on the specific structural representation; and
    normalizing the specific structural representation as the structural representation based on the layer attribute.

13. The device according to claim 12, wherein determining the layer attribute comprises determining at least one of:
    an identifier of the neural network layer;
    a type of the neural network layer;
    an upstream neural network layer of the neural network layer;
    a downstream neural network layer of the neural network layer; and
    a configurable attribute of the neural network layer.

14. The device according to claim 10, wherein obtaining the structural representation comprises:
    obtaining a file containing the structural representation; and
    parsing the file to obtain the structural representation.

15. The device according to claim 10, wherein obtaining the structural representation comprises:
　　requesting the structural representation from a deep learning application performing the deep learning processing; and
　　in response to receiving a response from the deep learning application, obtaining the structural representation from the response.

16. The device according to claim 10, wherein determining the resource amount comprises:
　　determining at least one of a memory resource amount and a computing resource amount of the dedicated processing resources required for the deep learning processing.

17. The device according to claim 16, wherein determining the memory resource amount comprises:
　　determining a layer memory resource amount for each neural network layer of the neural network based on the structural representation, the layer memory resource amount indicating a memory of the dedicated processing resources required for a corresponding neural network layer; and
　　determining the memory resource amount based on a sum of the layer memory resource amounts.

18. The device according to claim 16, wherein determining the computing resource amount comprises:
　　determining a layer computing resource amount for each neural network layer of the neural network based on the structural representation, the layer computing resource amount indicating a computing capability of the dedicated processing resources required for a corresponding neural network layer;
　　selecting, from the layer computing resource amounts, a target layer computing resource amount requiring a computing capability above a predetermined threshold; and
　　determining the computing resource amount based on the target layer computing resource amount.

19. A computer program product being tangibly stored on a non-transient computer readable medium and comprising machine executable instructions, the machine executable instructions, when executed, cause a machine to perform steps of a method of determining a resource amount of dedicated processing resources, comprising:
　　obtaining a structural representation of a neural network for deep learning processing, the structural representation indicating a layer attribute of the neural network that is associated with the dedicated processing resources; and
　　determining the resource amount of the dedicated processing resources required for the deep learning processing based on the structural representation.

* * * * *